United States Patent [19]
Glidden et al.
[11] 3,800,091
[45] Mar. 26, 1974

[54] SOLID STATE REMOTE UNIT FOR DATA TRANSMITTING SYSTEM

[75] Inventors: Roger C. Glidden, Wenham; Duane Marshall, Lexington, both of Mass.
[73] Assignee: David H. Scott, Wenham, Mass.

[22] Filed: May 12, 1972
[21] Appl. No.: 252,747

[52] U.S. Cl. .......... 179/4, 179/2 A
[51] Int. Cl. .......... H04m 11/00
[58] Field of Search .......... 179/2 R, 2 A, 2 DP, 2 C, 179/4, 5 R, 5 P

[56] References Cited
UNITED STATES PATENTS

| | | | |
|---|---|---|---|
| 3,702,902 | 11/1972 | Willis | 179/5 R |
| 3,613,093 | 10/1971 | Reynolds | 179/5 R |

*Primary Examiner*—Ralph D. Blakeslee
*Attorney, Agent, or Firm*—Clarence A. O'Brien; Harvey B. Jacobson

[57] ABSTRACT

Condition monitoring switch closure triggers input circuitry to turn on an analog interface between telephone lines and a solid state digital logic through which a preselected telephone number is dialed and coded tone bursts are transmitted identifying station location and switch closure. The programmed operational cycle of the logic is repeated until specific return tones on the telephone lines are detected to cause power shutdown and restoration of the system to an inactive state. All power for the system is derived from the telephone lines.

9 Claims, 13 Drawing Figures

PROGRAM CHART

| PHASE | TIME - SECONDS | OPERATION |
|---|---|---|
| 1 | 5 | Off-hook wait |
| 2 | 5 | On-hook wait |
| 3 | 10 | Off-hook wait |
| 4 | 20 | Dialing |
| 5 | 10 | Guard tone signalling |
| 6 | 10-25 | Message signalling |
| 7 | 10 | Return tone detection |
| 8 | 6 | Reset |

SOLID STATE REMOTE UNIT FOR DATA TRANSMITTING SYSTEM

This invention relates in general to the automatic transmission of information through telephone communication lines from a data reporting station, and more particularly to a data reporting system of the type disclosed in U. S. application Ser. No. 163,246, filed July 16, 1971 owned in common with the present application.

An important object of the present invention is to provide a data reporting system for use with a commercial telephone communication system that is generally similar in function and purpose to the system disclosed in the aforementioned application, but which features a solid state digital logic and a cooperating analog interface through which the logic is operatively connected to the telephone lines. Accordingly, a significant advantage of the present invention resides in the elimination of moving parts with all of the problems incident thereto such as wear and operational reliability. Further advantages of the apparatus of the present invention reside in increased flexibility as to functional options and auxiliary equipment.

In accordance with the present invention, a solid state digital logic device controls the programming and timing of the data reporting system whereby information is automatically transmitted through commercial telephone lines to a preselected information receiving station or central data collecting station. The digital logic is accordingly operative through its programming to select a predetermined telephone number and initiate automatic dialing of said number through the analog interface that is switched on in response to closure of one of several input switches by means of which various conditions may be monitored or sensed such as utility meters, pressure and temperature conditions, unauthorized intrusion, etc. Power for operating the digital logic as well as the components within the analog interface, is derived from the telephone lines and converted through the analog interface into suitable form. Under control of the digital logic the analog interface is operative to intermittently load the telephone lines for dialing purposes while oscillators also within the analog interface under control of the digital logic, generate signal tones of different frequencies to signal the data collecting station as well as to provide coded data identifying the location of the reporting station and the input switch triggering the reporting cycle. The digital logic is operative in response to reset signals from the analog interface to cause recycling until such time as a pair of return tone signals on the telephone lines are detected causing shutdown. The conventional handset of a telephone instrument may optionally be connected to the analog interface for use in a normal manner while the reporting system is in an inactive state. Also, an external audible alarm may be installed for alerting personnel whenever an automatic reporting cycle is intiated. Additional options may be provided by use of different input card circuits through which the condition sensing switches are coupled to the analog interface and the digital logic.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a simplified block circuit diagram illustrating the automatic reporting unit of the present invention at a data reporting station.

FIGS. 2*a* and 2*b* are schematic block diagrams illustrating in greater detail, the components of the reporting unit.

Figure 7A:
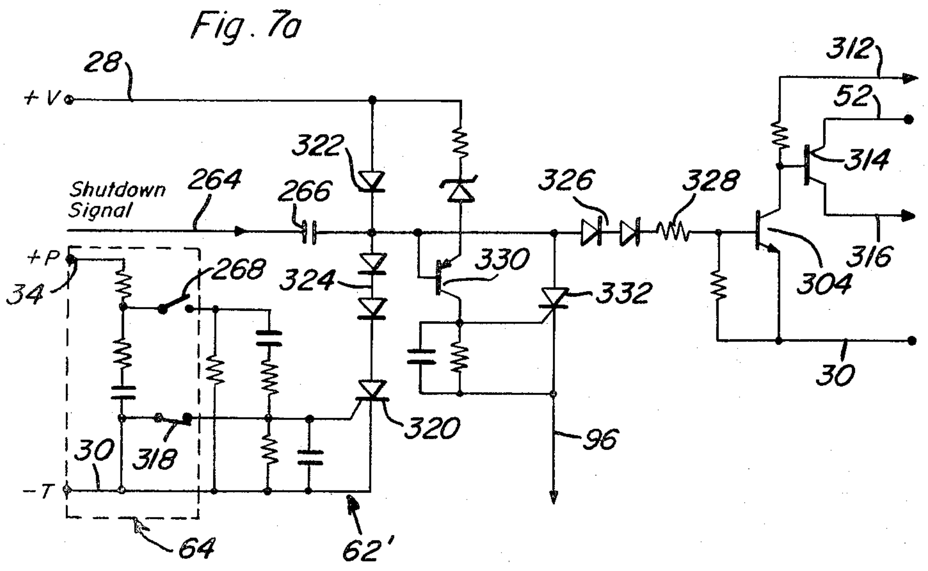
FIG. 7 is an electrical circuit diagram illustrating the shutdown control and input card control.

FIG. 7*a* is an electrical circuit diagram illustrating another form of input card control.

Figures 8, 9:
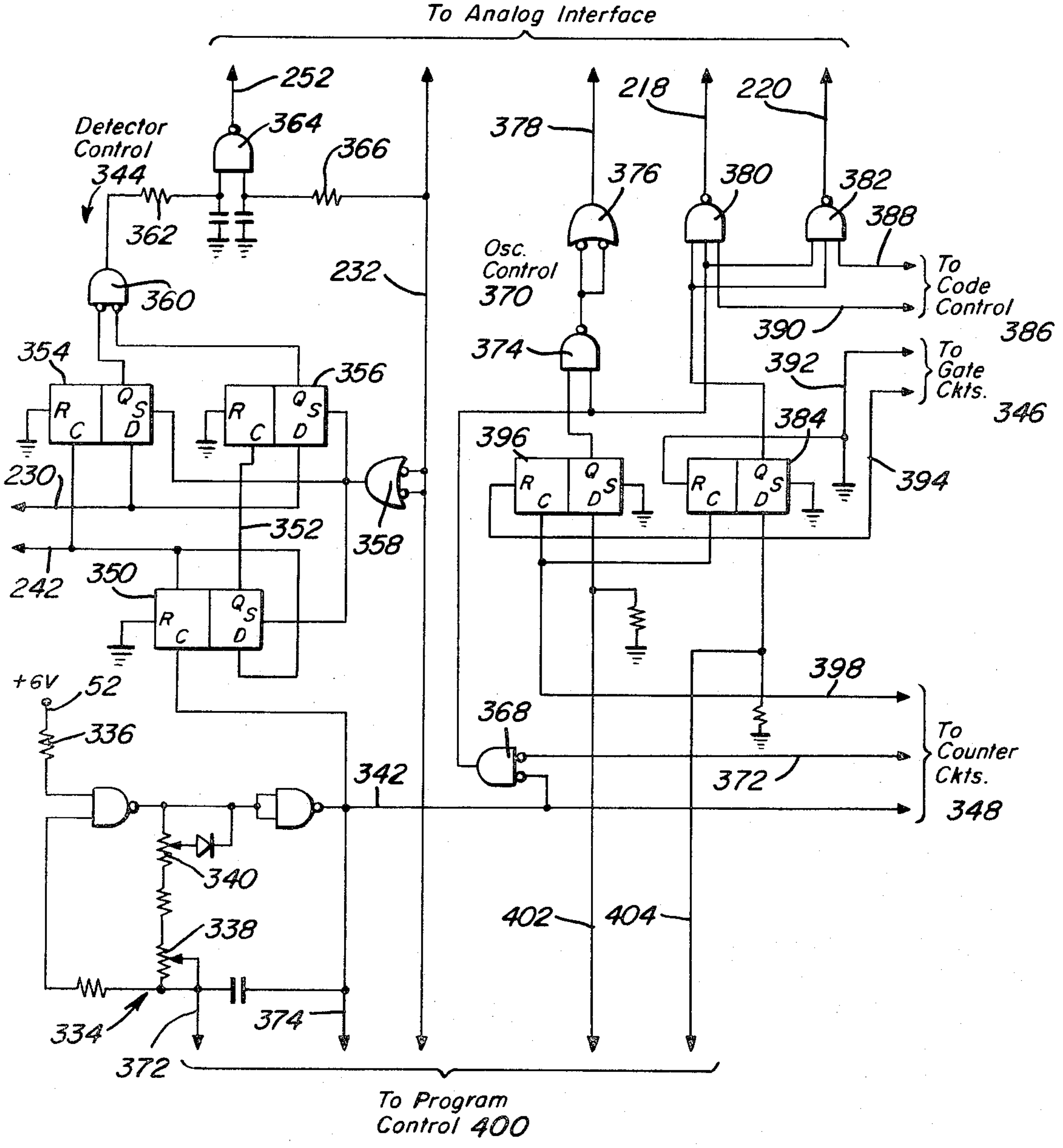

FIG. 8 is a program chart.

FIG. 9 is a simplified circuit diagram illustrating the timing clock and detector and oscillator controls in the digital logic.

Figures 10, 11:
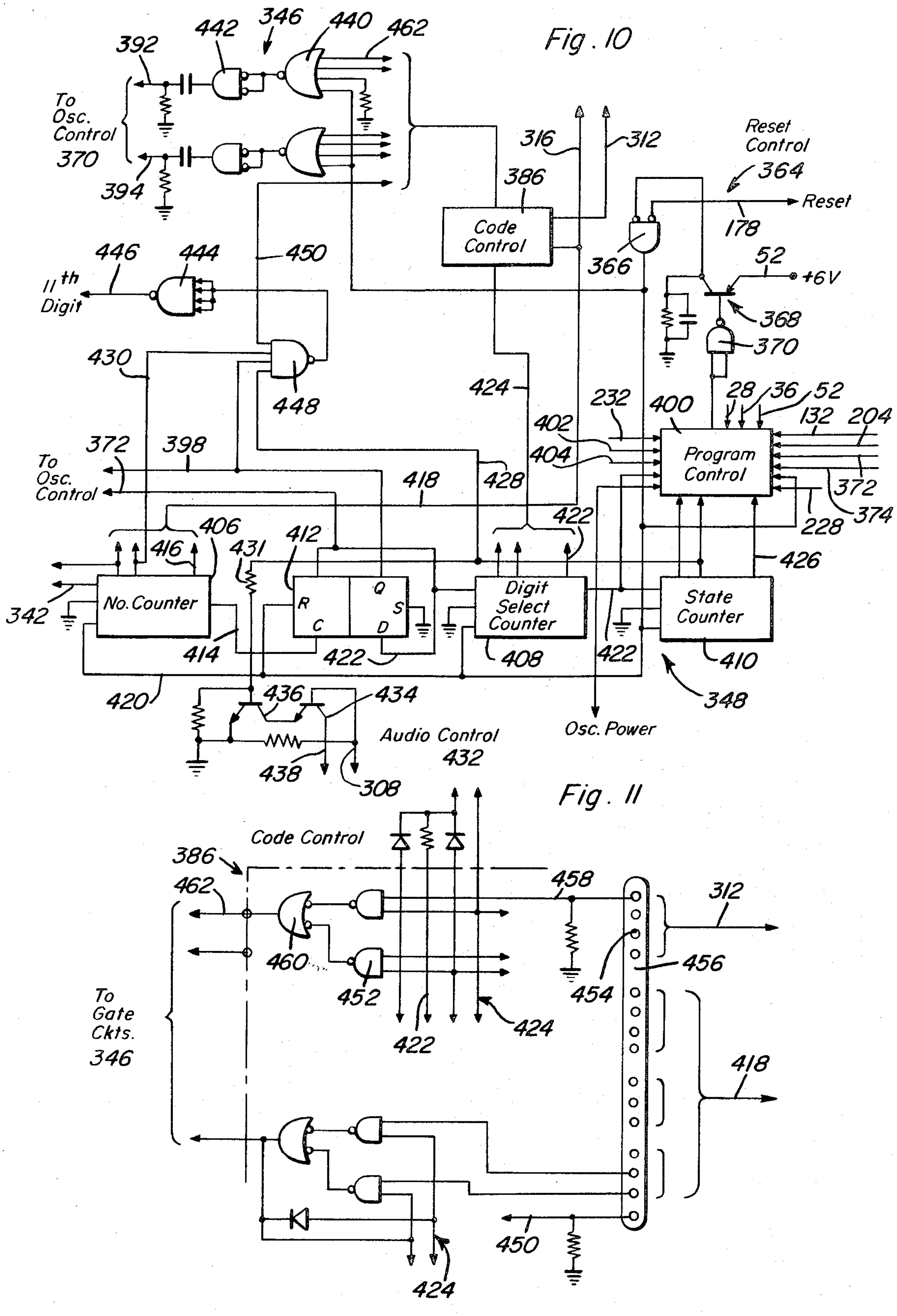

FIG. 10 is a circuit diagram illustrating some of the other components in the digital logic.

FIG. 11 is a circuit diagram illustrating some of the details of the code control components of the digital logic.

Figures 1, 2A:
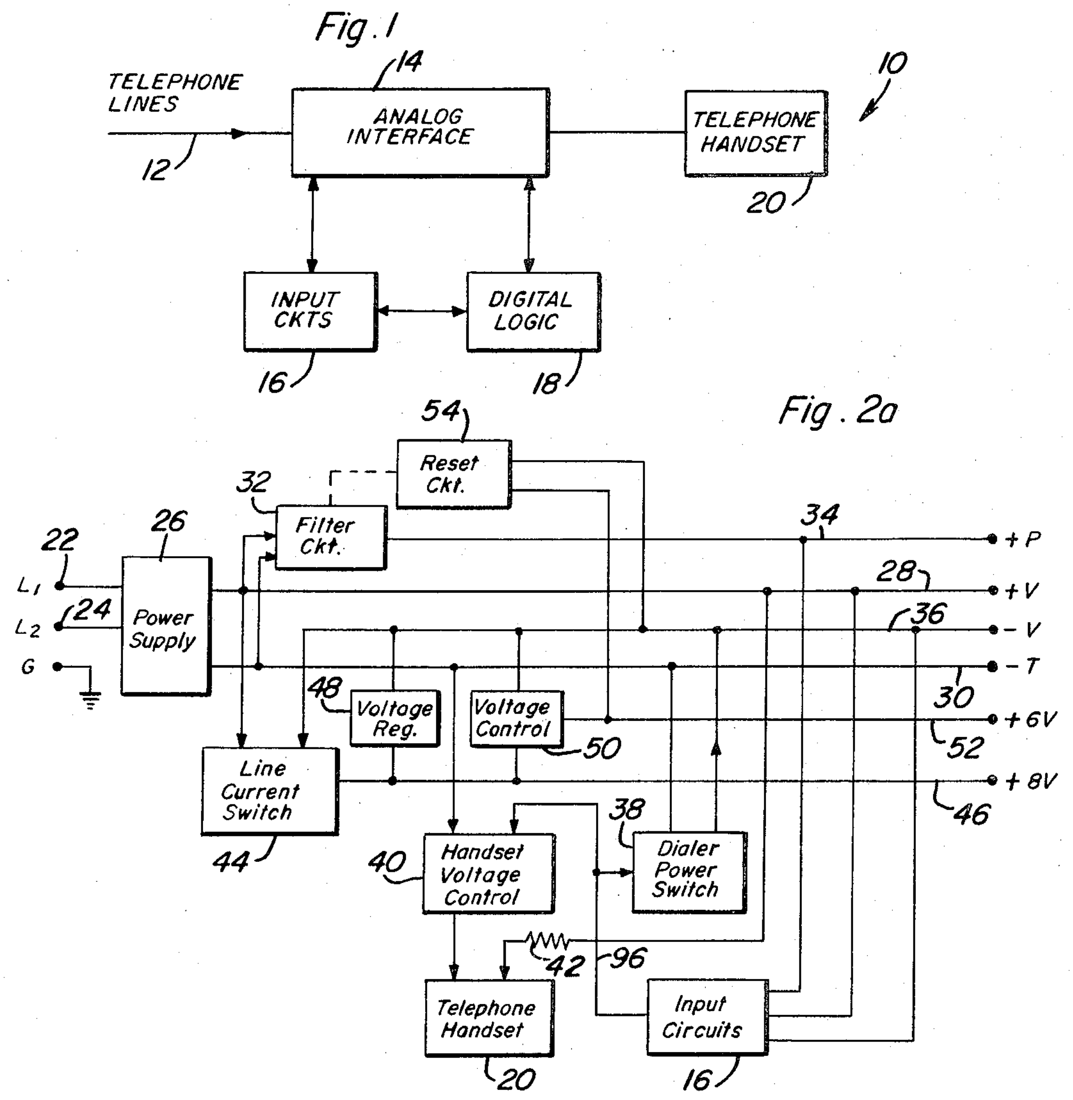

Referring now to the drawings in detail, FIG. 1 diagrammatically illustrates a remote unit at a reporting station generally referred to by reference numeral 10 to which commercial telephone lines 12 are connected. The telephone lines are connected to the unit through its analog interface 14 through which input circuits 16 trigger automatic operation. The analog interface interconnects the telephone lines with a solid state digital logic generally referred to by reference numeral 18 and may also optionally connect the telephone lines to a conventional telephone handset 20. The telephone handset is connected to the telephone lines through the analog interface for normal operation while the remote reporting unit 10 is in a quiescent condition. When triggered into operation by the input circuits 16, the analog interface is operative as will be hereafter disclosed in detail, to supply electrical energy from the telephone lines to the digital logic and control its clock rate. The digital logic on the other hand will be operative during each programmed operational cycle to control operation of oscillators within the analog interface in order to apply signals to the telephone lines, control the loading of the telephone lines for dialing purposes as well as program the various components in the analog interface. The analog interface also transmits signals in the telephone lines to the digital logic and disconnects the handset 20 when a reporting cycle is initiated.

Referring now to FIG. 2*a* in particular, the telephone lines are connected to the analog interface through terminals 22 and 24 in order to energize a power supply component 26 from which a pair of voltage output lines extend including a positive voltage line 28 and a negative voltage line 30. Through a filter circuit 32, connected to the positive voltage line 28, a highly filtered voltage is applied to the voltage line 34 for the input circuits 16 to which the positive voltage line 28 is also connected as well as a negative reference voltage line 36 receiving energy from a dialer power switch 38 which is triggered into operation by the input circuits 16. The input circuits are also operative through a handset voltage control component 40 to which the negative voltage line 30 is connected, to disconnect the telephone handset 20 that is normally connected to the telephone lines through negative voltage line 30 and resistor 42 connected to the positive voltage line 28. When a negative potential is established on the negative voltage line 36 through the dialer power switch, a line current switch component 44 is also energized in order to initiate automatic operation under control of the digital logic 18 to which the negative voltage line 36 is connected, the line current switch being connected to the negative and positive voltage lines 36 and 38 so as to controllably load the telephone lines while feeding electrical energy to a positive voltage line 46. A voltage regulator 48 is connected across the positive and negative lines 46 and 36. Also, a voltage control component 50 is connected across the positive and negative voltage lines 46 and 36 in order to supply a reduced voltage to positive voltage line 52. A manually controlled, reset circuit 54 is connected across the positive and negative voltage lines 52 and 36 and interconnected with the filter circuit 32 in order to either recycle or terminate operation of the remote unit as will be explained hereafter in detail.

Figures 2B, 3, 4:
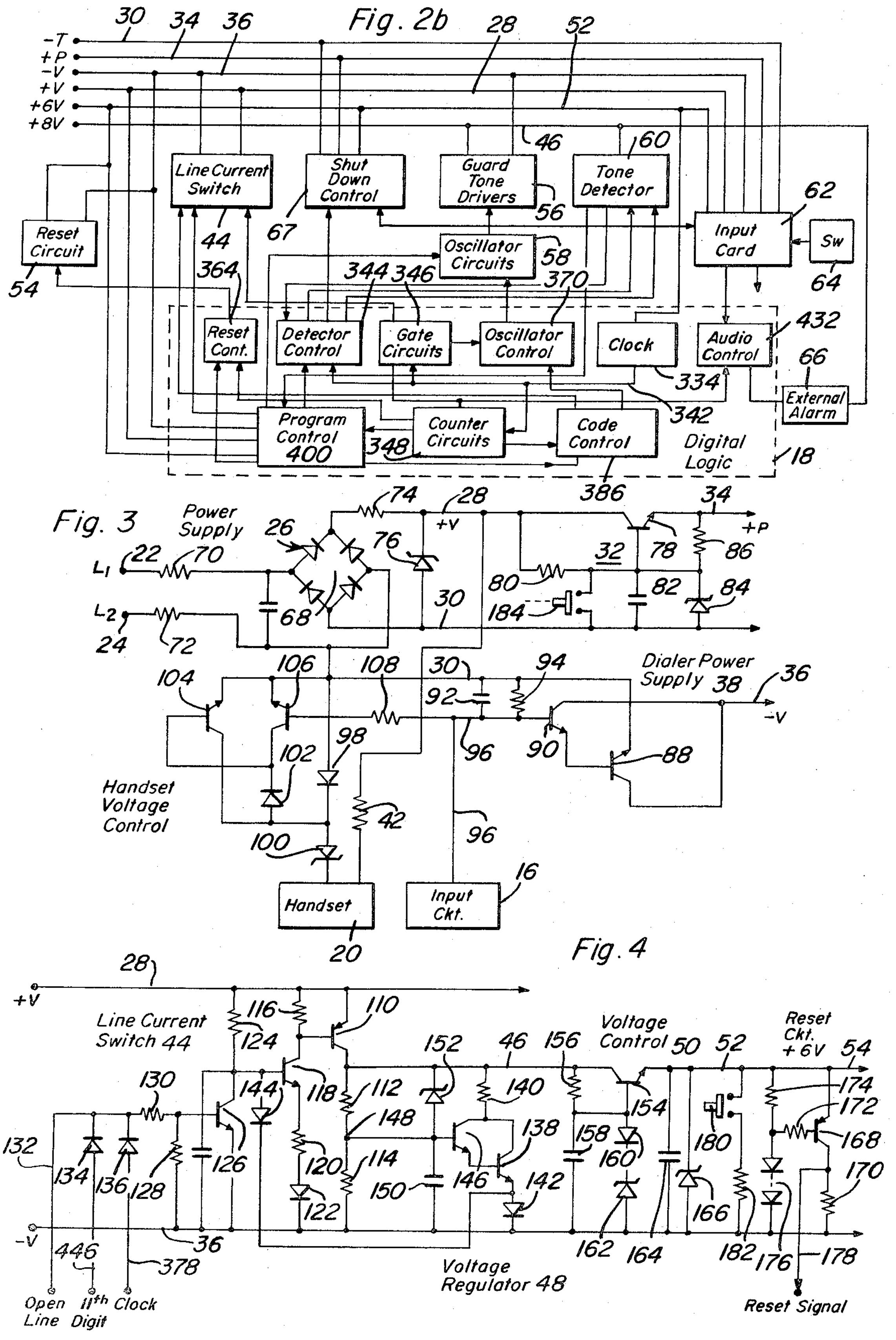
FIG. 3 is an electrical circuit diagram illustrating some of the power supply and control components in the analog interface.
FIG. 4 is an electrical circuit diagram illustrating some of the other components of the analog interface.

It will become apparent that the analog interface 14 operates and monitors loading of the telephone lines, detects dial and return tone signals, applies dialing pulses and code tones to the telephone lines, and converts the electrical energy in the telephone lines into proper voltage supplies for the various components of the remote reporting unit. As shown in FIG. 2*b* the analog interface also includes guard tone drivers 56 by means of which signal tones of three different frequencies are applied to the telephone lines as will be explained hereafter. These signal tones are supplied to the guard tone drivers from oscillator circuits 58. Dial tone and return tones across the telephone lines are detected by a tone detector component 60 rendered operative during an operational cycle. As also shown in FIG. 2*b*, the voltage supply made available through the analog interface, is connected to a replaceable input circuit card 62 through which the switch component 64 triggers the unit into operation through the dialer power switch component 38 aforementioned in connection with FIG. 2*a*. The input card circuit 62 is also operative through the digital logic 18 to trigger into operation an external alarm 66 connected to the positive voltage line 46 and control a power shutdown component 67.

As shown in FIG. 3, the power supply 26 includes a full wave rectifier 68. The telephone line terminals 22 and 24 are connected to the input terminals of the rectifier 68 through resistors 70 and 72 so as to supply a rectified voltage at the output terminals of the rectifier including the negative output terminal to which the negative voltage line 30 is connected and the positive output terminal to which the positive voltage line 28 is connected through resistor 74. Zener diode 76 connected across the voltage lines 28 and 30, clips off high voltage transients.

The positive voltage line 28 is connected to the collector of transistor 78 in the filter circuit 32 and through bias resistor 80 to the base of the transistor. The output emitter of transistor 78 is connected to the positive voltage line 34 aforementioned in order to supply a highly filtered voltage to the input circuits. The transistor 78 is switched on so as to supply the highly filtered voltage on line 34 by charging of capacitor 82 through resistor 80, the capacitor 82 being connected between the negative voltage line 30 and the base of transistor 78 in order to establish forward bias after a predetermined delay period in order to permit voltage conditions across the telephone lines to stabilize before automatic operation of the unit begins. Transient voltages supplied to the base of transistor 78 are cut off by the zener diode 84 which is connected in parallel with the capacitor 82. The base circuit for the transistor 78 is separated from the highly filtered voltage line 34 by reisstor 86.

As also shown in FIG. 3, the negative output of rectifier 68 is connected through transistor 88 in the dialer power switch 38 to the negative voltage line 36, the base of the transistor 88 being connected to the output emitter of transistor 90, the collector of which is also connected to the negative voltage line 36. With the input circuits 16 being in the inactive state, a cutoff voltage is maintained on the base of transistor 90 through the capacitor 92 and resistor 94 connected in parallel between the negative voltage line 30 and the signal voltage line 96. Accordingly, an input signal in line 96 originating from the input circuits 16, switches on the transistor 90 so as to remove cutoff voltage on the base of transistor 88 thereby connecting the negative voltage line 36 to the input terminal of rectifier 68 in order to supply electrical energy for initiating automatic operation of the unit.

The telephone handset 20 is normally connected to the telephone lines through the rectifier 68. The positive output voltage line 28 is accordingly connected by the resistor 42 to one terminal of the handset while the other terminal is connected to the negative output of the rectifier through diode 98 and zener diode 100. If the handset 20 is picked up before automatic operation of the unit is triggered by the input circuits, base current will be conducted by diode 102 to the base of transistor 104 thereby switching it on in order to conduct current to the dialer power switch in order to insure that there will be sufficient voltage available to operate the input circuits. When a signal arrives from the input circuit through line 96, a forward bias voltage is supplied to the base of transistor 106 through resistor 108 so that it will be rendered conductive and thereby effectively disconnect the handset from the telephone lines while turning off transistor 104.

The line current switch 44 is operative to load and unload the telephone lines during dialing and hook operations initiated when the negative voltage line 36 is energized through the dialer power switch 38 as aforementioned. As shown in FIG. 4, the line current switch includes a line loading transistor 110 having an input emitter connected to the positive voltage line 28 and an output collector connected through load resistors 112 and 114 to the negative voltage line 36. Cutoff voltage is applied to the base of transistor 110 from the positive voltage line through resistor 116 when driver transistor 118 is in non-conductive state. The output emitter of transistor 118 is connected to the negative voltage line 36 through resistor 120 and diode 122 in order to establish a forward bias on the base of transistor 110 when the driver transistor 118 is switched on.

Base bias for the transistor 118 is regulated by resistor 124 connected between the positive voltage line 28 and the base to which the collector of signal transistor 126 is connected. The emitter of transistor 126 is connected to the negative voltage line 36 and its base is maintained at a predetermined level above the potential on the negative voltage line through resistor 128. Transistor 126 is switched on by a signal voltage applied to the base through resistor 130. Signal voltage is applied to the base of transistor 126 from the digital logic through open line 132, diode 134 or diode 136 as will be explained hereafter. It will therefore be apparent that by means of the signal transistor 126 and driver transistor 118, signal voltages applied from the digital logic will be operative to intermittently load and unload the telephone lines through transistor 110.

The voltage regulator 48 as shown in FIG. 4, includes a transistor 138 connected in series with resistor 140 and diodes 142 between the negative voltage line 36 and regulated voltage line 46 which is connected to the output collector of transistor 110 of the line current switch 44. The bias level on the output emitter of transistor 138 is established by resistor 124 and diode 144 connected in series between the positive voltage line 28 and the emitter of transistor 138. Transistor 138 is switched on in order to conduct current and maintain a substantially constant voltage in regulated voltage line 46 by transistor 146 having an output emitter connected to the base of transistor 138 and a collector connected to resistor 140. Base bias for transistor 146 is supplied from the junction 148 between the resistors 112 and 114 loading the output circuit of transistor 110. Thus, transistor 146 is switched on and off under control of the voltage stored in capacitor 150 connected between the base of transistor 146 and the negative voltage line 36. The bias voltage is furthermore regulated by the zener diode 152 connected between the regulated voltage line 46 and the base of transistor 146.

A reduced regulated voltage is maintained on positive voltage line 52 by means of the voltage control 50 which as shown in FIG. 4 includes transistor 154 having an input collector connected to the voltage line 46 and an output emitter connected to the regulated voltage line 52. Bias for the base of transistor 154 is established through resistor 156 connected between the voltage line 46 and the base and through which capacitor 157 is charged.

Diode 160 and zener diode 162 are connected in series between the base of transistor 154 and the negative voltage line 36 in parallel with the capacitor 158 to control the charging and discharging thereof in order to maintain a substantially constant reduced positive voltage at the output emitter of transistor 154. The output voltage of transistor 154 is filtered by capacitor 164 and excessively high voltages clipped by zener diode 166, the capacitor 164 and zener diode 166 being connected across the voltage lines 52 and 36 for this purpose.

The reset circuit 54 aforementioned is also connected between the voltage lines 52 and 36 as shown in FIG. 4 and includes a transistor 168 having an input emitter connected to the positive voltage line 54 and an output collector by resistor 170 to the negative voltage line 36. The base of transistor 168 is connected by bias resistor 172 to the juncture between the resistor 174 and the diodes 176 connected in series with the resistor between the voltage lines 52 and 36. The output collector of transistor 168 is connected by a reset signal line 178 to the digital logic. Changes in voltage across the telephone lines controls the switching of the transistor 168 to transmit signals through line 178 to the digital logic causing reset or recycling. This reset operation may be manually effected by closing of the normally open reset switch section 180 connected in series with the resistor 182 between the voltage lines 52 and 36. The switch section 180 is ganged with the switch section 184 as shown in FIG. 3, switch section 184 being connected in parallel with the capacitor 82 and zener diode 84 in the filter circuit 32. Closing of the switch section 184 causes discharge of the capacitor 82 so as to remove bias voltage from the transistor 78 opening the filter circuit.

Figure 5:
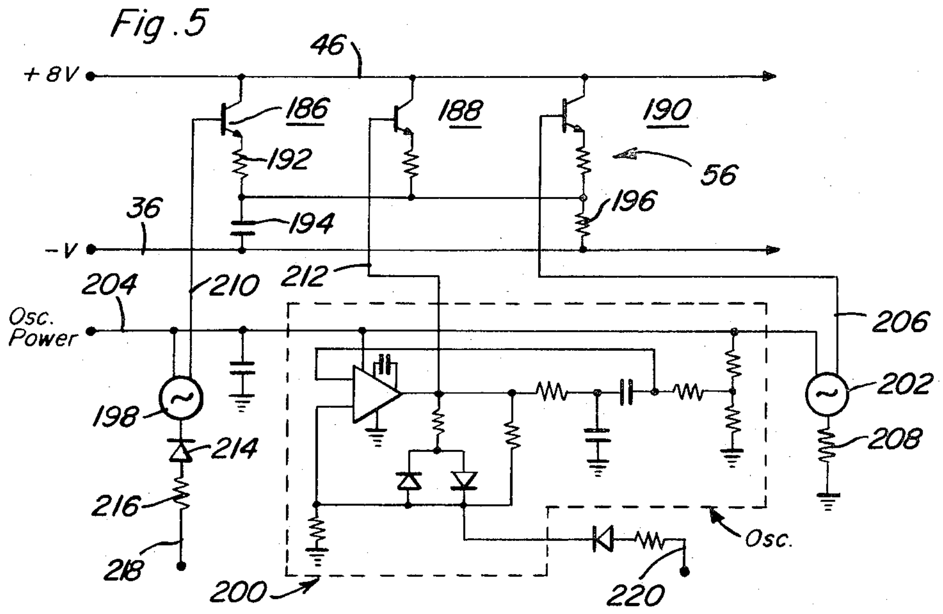
FIG. 5 is an electrical circuit diagram illustrating the guard tone driver and oscillator circuits in the analog interface.

As hereinbefore indicated, signal tones are transmitted to the telephone lines by driver circuits 56 connected across the voltage lines 46 and 36. As shown in FIG. 5, the driver circuits include three transistors 186, 188 and 190 having their input collectors connected to the positive voltage lines 46 and output emitters respectively connected by resistors 192 to an RC circuit including parallel connected capacitor 194 and resistor 196 connected to the negative voltage line 36. The driver transistors 186, 188 and 190 are respectively switched on and off at three different audio frequencies by oscillation signals supplied to the bases from oscillator circuits 198, 200 and 202. When power is supplied to each of the oscillators from the digital logic through power line 204, guard tone signal is supplied through output signal 206 from the oscillator 202 to the driver transistor 190. The oscillator 202 is connected to ground through resistor 208 in order to provide a continuous output signal at one frequency in line 206. The outputs of oscillators 198 and 200 on the other hand, are fed through output lines 210 and 212 to the bases of transistors 186 and 188 and are gated under control of clock signals from the digital logic supplied to the oscillators 198 and 200 through series connected diodes 214 and resistor 216 by signal lines 218 and 220. Except for specific frequency establishing component values, the circuits for the oscillators are identical as shown in detail with respect to oscillator 200, in the illustrated embodiment of FIG. 5.

Figures 6, 7:
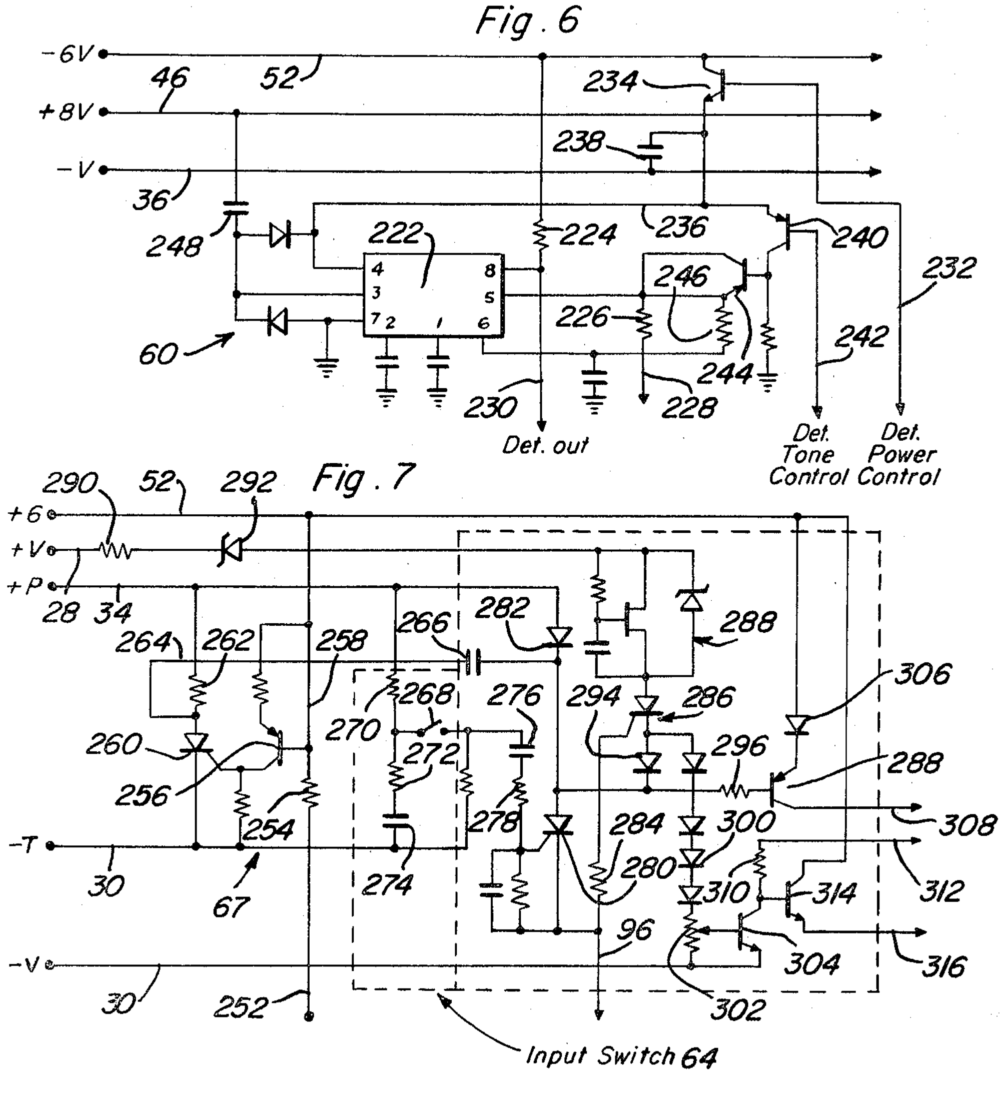
FIG. 6 is an electrical circuit diagram illustrating the tone detector component in the analog interface.

The tone detector circuit 60 as shown in detail in FIG. 6, is operative to detect the dial tone across the telephone lines, and signal the digital logic as well as to detect the return tone signals as the end of an operational cycle approaches in order to effect automatic shutdown. The detector circuit includes a detector logic 222 that is energized through resistor 224 from the positive voltage line 52, to transmit a dial tone signal pulse through resistor 226 and line 228 to the digital logic or confirm tone signals at two different frequencies through signal line 230 to the digital logic. The detector logic 222 is rendered operative for sensing the two different return tone frequencies by means of a signal supplied from the digital logic through line 232 to a power control transistor 234 having an input collector connected to the positive voltage line 52 and an output emitter connected to line 236, the emitter bias being controlled by capacitor 238 connected between the emitter and the negative voltage line 36. When a power signal is supplied to the base of transistor 234 from the digital logic at the proper time, current will be conducted through transistor 240 under control of a switching signal supplied to its base from the digital logic through line 242 in order to switch on transistor 244. The transistor 244 interconnects two terminals of the detector logic 222 through potentiometer 246 for establishing two separate alternative conductive paths in order to establish two different frequencies to which the detector logic responds. The return tone signal input to the detector logic is established by signal capacitor 248 connected between the positive voltage line 46 and the input terminals of the detector logic.

The analog interface also includes the shutdown control 67 shown in detail in FIG. 7 which is operative to terminate an operational cycle in response to a signal supplied thereto from the digital logic through signal line 252. Signal line 252 is connected by resistor 254 to the base of transistor 256 which is maintained at a predetermined bias level from positive voltage line 52 by resistor 258. A shutdown signal in line 252 is accordingly operative to switch on transistor 256 supplying a trigger signal to the gate of silicon controlled rectifier (SCR) 260. The SCR 260 is connected in series with resistor 262 between the positive voltage line 34 and negative voltage line 30 so as to normally hold a relatively high voltage on the shutdown signal line 264 to the input circuits 16. Thus, when the trigger is supplied to the gate of SCR 260, it conducts in order to drop the potential in shutdown signal line 264 in order to signal shut down.

The signal shutdown line 264 is connected to the input card circuit 62 through signal capacitor 266 as shown in FIG. 7. This input card circuit in addition to effecting shutdown of the system in response to receipt of a shutdown signal, from the shutdown circuit 67, is operative to control the input code by rendering an address code operative in the digital logic as well as to turn on the external alarm 66. In the embodiment illustrated in FIG. 7, a normally opened input switch element 268 in the input switch circuit 64 is connected between the series connected resistors 270 and 272 which are in turn connected in series with capacitor 274 between the voltage lines 34 and 30 so as to supply an activating signal pulse upon closure of the switch element 68 to the input card circuit through signal capacitor 276 connected by resistor 278 to the gate of SCR 280. Thus, the switch closure renders the SCR 280 conductive in order to conduct current from the positive voltage line 34 through diode 282 to the activating signal line 96 to the dialer power switch 38 aforementioned. SCR 280 latches on to remain conductive after removal of the trigger pulse. The activating signal applied to line 296 is also fed through resistor 284 to the gate of SCR 286. The anode of SCR 286 is connected by a constant current regulating circuit 288 to the positive voltage line 28 through resistor 290 and zener diode 292. Accordingly, when the SCR 286 is turned on, current is conducted through diode 294 and resistor 296 to the base of transistor 298 and through the series connected diodes 300 and potentiometer 302 to the base of transistor 304. The transistor 298 when switched on connects the positive voltage line 52 through diode 306 to the digital logic through audio control line 308 for turning on the external alarm 66. The transistor 304 on the other hand when switched on connects the negative voltage line 36 to the digital logic through resistor 310 in order to activate the address code. Resistor 310 is connected to the digital logic through line 312. Also, transistor 314 is switched on in order to connect the positive voltage line 52 to the digital logic through line 316 in order to activate the telephone dialing code. When the shutdown signal is established by removal of voltage from the shutdown signal line 264, reverse anode voltage is applied to the SCR 280 for unlatching the same. This reverse voltage applies gate voltage through resistor 284 to the SCR 286 causing it to latch into a conductive state until power is removed from voltage line 34 since the reverse voltage drops the cathode voltage through diode 294 below gate voltage. Base current is then conducted through diodes 300 and potentiometer 302 to the base of transistor 304 causing it to switch off. Also, the reverse voltage applied through resistor 296 to the base of transistor 298 switches it off.

The input card circuit described with respect to FIG. 7 is rendered operative to supply an activating signal to the dialer power switch through line 96 regardless of the loaded condition of the line so as to give automatic reporting operation priority and cause disconnection of the telephone handset even while in use. A non-priority type of input card circuit 62' is illustrated in FIG. 7*a.* With this type of input card circuit, closure of input switch element 268 or opening of normally closed switch element 318 will supply a trigger pulse to the gate of SCR 320 causing it to latch on and to conduct current from the positive voltage line 28 through diodes 322 and 324 to the negative voltage line 30. As a result thereof, the cut-off potential applied to the base of transistor 304 through diodes 326 and resistor 328 is removed so as to switch it on as well as to switch on transistor 314 in order to establish the code connections aforementioned in connection with the input card circuit 62. When SCR 320 is latched on and becomes conductive, cut-off bias applied to the base of transistor 330 from voltage line 28 is removed. Transistor 330 then conducts to supply a trigger to the gate of SCR 322 causing it to latch into a conductive state and supply an activating signal to the dialer power switch through line 96. When a shut-down signal is supplied to line 264, a reverse anode voltage is applied to the SCR 320 causing it to unlatch. The reverse anode voltage is also applied to the base of transistor 330 so as to switch off the SCR 332 thereby disabiling the dialer power switch as well as to switch off transistors 304 and 314 as aforementioned in connection with FIG. 7.

As diagrammatically shown in FIG. 2*b*, the digital logic 18 is operative to control and program the analog interface. The digital logic includes a source of timing pulses from the clock component 334 connected to the voltage line 52 through a resistor 336 as shown in FIG. 9. The clock generates pulses at a rate adjusted by the potentiometer 338 when supplied with voltage from line 52 after the dialer is activated and for a duty cycle adjusted by the potentiometer 340. Clock pulses are fed by an output line 342 to a detector control component 344 and gate circuits 346 as well as to counter circuits 348.

The detector control component 344 as shown in greater detail in FIG. 9, is operative to respond to the various signal tones detected by the tone detector 60 as hereinbefore described and generate a shut-down signal that is fed to the shut-down control through line 252. Clock pulses from the clock are applied through line 342 to one terminal of the flip-flop 350 of the detector control component to alternatively produce outputs in line 242 and line 352 respectively connected to input terminals of flip-flops 354 and 356. The other input terminals of flip-flops 354 and 356 are connected by line 230 to the detector logic 222 in FIG. 6. Accordingly, the flip-flops 350, 354 and 356 are operative in response to the clock pulses to alternately tune the detector logic to the two different frequencies of the return tones to which the unit is to respond when the flip-flops are set by a signal supplied to the set terminals thereof from gate 358. The input terminals of the gate 358 are connected to the signal line 232 through which a power signal is supplied to the power control transistor 234 of the detector circuit 60 aforementioned. Accordingly, when two return tone signals corresponding to the frequencies to which the detector logic is tuned is received, simultaneous outputs are produced at the output terminals of flip-flops 354 and 356 connected to the input terminals of gate 360. The output of gate 360 is connected by resistor 362 to one of the input terminals of gate 364, the other input terminal being connected by resistor 366 to the detector power signal line 232 through which the tone detector component 60 and the detector control component 344 are simultaneously rendered conductive at the proper time during the operational cycle. The output of the gate 364 is therefore responsive to the receipt of the two proper return tone signals to supply a shut-down signal in line 252.

The clock pulses in line 243 are also applied to one of the input terminals of gate 368 of the oscillator control component 370 as shown in FIG. 9, the other input terminal of gate 368 being connected to the counter circuit through line 372. Thus, under control of the counter circuits, the clock pulses are applied to one terminal of gate 374 and gate 376 to the line current switch through line 378, in order to effect loading of the telephone lines. Line 378 is connected by the diode 136 to the line current switch as hereinbefore described with respect to FIG. 4. The output of gate 368 is also connected to one of the three input terminals of each of the gates 380 and 382 in order to control the gating of the outputs from oscillators 198 and 200 to which the gates 380 and 382 are connected by lines 218 and 220. The gating signal outputs of gates 380 and 382 are also controlled by the output of flip-flop 384 and by pulses from the code control component 386 of the digital logic through lines 388 and 390. Through line 392 from the gate circuits 346, the flip-flop 384 is reset while line 394 resets the flip-flop 396 from which an output is fed to the other input of gate 374 through which the clock signal is supplied to the line circuit switch as aforementioned. The outputs of flip-flops 396 and 384 are derived from inputs applied to these flip-flops from the counter circuits through line 398 and from the program control 400 through lines 402 and 404. The oscillator control is thus operative to control the dial pulsing of the lines through the line current switch, switching on and off of the oscillators for guard tone signalling and gate the oscillators to generate location and input identification codes.

As shown in FIG. 10, the counter circuits include three decade counters consisting of a number counter 406, a digital select counter 408 and a state counter 410. The number counter is interconnected with the digit select counter through a flip-flop 412 having an interdigit delay function while the digit select counter 408 is interconnected with the state counter 410. The counter circuits are operative to control timing of the dialing and code generating operations and the other program functions of the digital logic. The number counter selects the number of digits in the code, the flip-flop 412 spaces the digit pulses, the digit select counter 408 selects the code digits and the state counter times the operations through the program control 400.

The clock pulses are fed from the clock 334 to the number counter through line 342 to produce an output in line 414 at one-tenth the input clock pulse frequency. The input clock pulses to the counter 406 are registered at ten outputs 416 connected by a code cable jumper 418 to the dialing code terminals of the code control 386 as will be hereafter explained. The counter 406 is reset by a reset signal supplied thereto through reset signal line 420.

The clock pulse frequency divided by 10 in the output 414 of counter 416, is connected to the input terminal of flip-flop 412 in order to further divide the clock pulse frequency by two in the output pulse line 422 connected to the digital select counter 408 and to the oscillator control through line 372. Thus, the oscillator control is rendered operative to gate the outputs of the oscillators at one-twentieth of the clock pulse frequency of clock 334. Also, the clock pulses divided by 20 are operative through the oscillator control to space the dial pulses through the gates 374 and 376 connected to the line circuit switch 44 by means of which the telephone lines are intermittently loaded to produce the dialing pulses. The output of flip-flop 412 is also connected through line 398 to the input of flip-flop 396 in the oscillator control component in order to set this flip-flop at the middle of each dial pulse time thereby separating the dial pulses by an amount equal to one-twentieth of the clock frequency as aforementioned.

The ouptut of the flip-flop 412 is connected to the input terminal of the digit select counter 408 by means of which the clock pulse frequency is further divided by ten to produce an output pulse in line 420 having a frequency that is equal to the original clock pulse frequency divided by 200. This output is also applied to the program control 400. The 10 digit count of the counter 408 is registered by the outputs 422 connected to the code control 386. The output 420 of the counter 408 is then fed to the state counter 410. By means of the connection 424 to the code control 386, the digit select counter 408 is operative to select the digits of the dialing code by means of which the code control 386 is operative to effect automatic dialing through the gate circuits 346 and the oscillator control 370. The digit select counter 408 is reset simultaneously with the number counter 406 through the reset line 420.

The state counter 410 is operative to register the divided clock pulses fed thereto from line 422 on the ten output lines 426 connected to the program control 400. Selected digit terminals of the counters 408 and 410 are interconnected through line 428 connected to the gate circuit for establishing coincidence with a selected number of pulses established by connection of line 430 to one of the terminals 416 of the counter 406 as will be explained hereafter. The coincidence signal line 428 is also connected by resistor 431 to the audio control 432 by means of which the external alarm is turned on.

The audio control 432 includes a transistor 434, the base of which is connected to the audio control line 316 from the input card circuit causing the transistor to switch on at the beginning of an operational cycle. When switched on, the transistor 434 completes a conductive circuit through the transistor 436 between ground and the line 438 to the external alarm 66 to which the positive voltage line 46 is connected. Accordingly, the external alarm is energized during an operational cycle until a cut-off voltage signal is supplied to resistor 436 from the counters to the base of transistor 436 opening the energizing circuit for the external alarm.

The gate circuits 346 include a plurality of gates 440 to which various output lines from the code control are connected in order to produce control pulses that are fed to gates 442 and line 392 and 394 to the flip-flops 384 and 396 of the oscillator control 370. The control pulses are thus operative to timely reset the flip-flops in order to respectively control the loading of the telephone lines through the line current switch and gate the signal tones applied through the driver circuits to the telephone lines. A gate 444 also applies an eleventh digit signal pulse through line 446 to the line current switch for area code dialing purposes. The gate 44 is connected to the output of a coincidence gate 448 to which lines 428 and 430 are connected. Line 398 from the counter flip-flop 412 is also connected to the gate 448 as well as a line 450 from the code control 386.

Referring now to FIGS. 10 and 11, the code control includes the digit registering output lines 442 from the digit select counter 408 interconnected with the inputs of selected gates 452, the gates 452 having input terminals connected to selected code terminals 454 carried by a cable 456, the terminals 454 being connected to the gate inputs through lines 458. In one embodiment of the present invention, there are fourteen gates 452 the outputs of which are connected to the inputs of five gates 460 from which output lines 462 extend to the gate circuits 346 aforementioned. A group of the code terminals 454 are interconnected through the jumper cable 418 aforementioned with the terminals 416 of the number counter 406 to which the 6-volt line 52 is connected through the transistor 314 in the input card circuit as aforementioned in connection with FIG. 7. Thus, the dialing code is established. Another group of code terminals 454 are connected through line 312 to the input card circuit in order to activate the address code. One of the code terminals 354 is connected by line 450 to the gate 448 in the gate circuit as aforementioned for area code signalling purposes. The gates 440 in the gate circuit also have input terminals thereof connected to the reset signal line 420 which extends from the reset control 364.

Referring now to FIG. 10, the reset control includes a gate 366, the output of which is connected to reset signal line 420 and having an input terminal connected to line 178 from which a reset pulse is fed from the reset circuit in the analog interface hereinbefore described. The reset signal delivered by the gate 366 occurs when transistor 368 is switched on under control of the program control 400 by a signal fed to the base of transistor 368 through gate 370.

The program control 400 controls the clock frequency, dial, code, detector and reset functions by means of selective wiring to the state counter inputs 426 through simple gate circuits. The clock 334 accordingly connected by lines 372 and 374 to the program control 400 in order to select the desired clock pulse frequency in its zero or quiescent state; the program control will provide 0 volts on the open line terminal to which the line circuit switch 44 is connected through line 132 for a period of 5 seconds and then apply +6-volts for another period of 5 seconds. This timing is determined by the clock frequency divided by the decade counters 406 and 408 and the flip-flop 412. During the initial 5 seconds, the telephone lines are loaded by the line current switch to acquire power from the telephone lines. During the second 5-second period, the telephone lines are unloaded through the line current switch to permit the lines to be cleared. During state one, the program control has no outputs and the lines are once again loaded for a period of 10 seconds awaiting the dial tone signal. In the second state of the program control, a dial tone signal is detected from the detector 60 through line 228 causing the dial tone terminal to which line 402 is connected to go high which is operative through the flip-flop 396 to enable dial pulsing to occur through the gates 374 and 376. Each time the flip-flop 412 in the counter circuit is set, pulsing occurs as the output of flip-flop 396 opens gate 374 allowing clock pulses to go through gate 376 to the anode of diode 136 in the line current switch. This switches on transistor 110 with a duty cycle dependent on that of the clock 334. Dial pulses continue until flip-flop 396 is reset by the gate circuit through which the coincidence of the number counter 406 and the digit select counter 408 is detected. The output 416 of the number counter 406 is chosen through the jumber 418 so that each 2 second output of the digit select counter 408 will select an output of the counter 406 to reset the flip-flop 396 and thus control the number of output pulses. In this fashion, 10 different groups of output pulses may be generated and will dial the telephone numbers selected by the cable connection 418. The digit pulses are separated in time by the operation of the flip-flop 412 which sets the flip-flop 396 only at the middle of each 2 second dial time.

In the third state of the programming control 400, dialing operation terminates and the input terminal of flip-flop 396 goes low while the terminal of the program control to which line 204 is connected goes high in order to supply operating energy to the oscillators causing oscillator 202 to operate. At that time, operation of the oscillators 198 and 200 are suppressed by resistors 216 and diodes 214. As a result, a guard tone signal is applied to the telephone lines.

When state four of the program control occurs, oscillator 202 continues to operate while oscillators 198 and 200 are gated through flip-flop 384, the gate circuits and the code control in a manner similar to the way in which the dial pulses are generated. The input code is controlled through the input card circuit wherein the transistors 304 and 314 are switched on when the SCR 280 is in a conducting state. Transistor 314 connects the voltage line 52 to one of the terminals 416 of the counter 406 so that if the input card is activated by an input switch, it connects a selected terminal 416 of counter 406 to one of the terminals 416 and a code terminal in the code control to the positive voltage line 52 and only one code pulse will be generated. The fifth and sixth states of the programming control may be used to repeat the code pulsing. In the seventh state, the program control operates the tone detector logic 222 by placing a high on line 232 to switch on the power transistor 234 and set flip-flops 350, 354 and 356. Flip-flop 350 alternately tunes the detector 222 to two different frequencies corresponding to the return tones. If tones are present, on the voltage line 446 the output of the detector 222 on line 230 will be low so that the flip-flops 354 and 356 will be clocked to reset resulting in a low output from gate 364. This fires the SCR 260 in the shut-down control 67 through transistor 256 to shut down operation.

The eighth state of the program control may be attained if no return tone signals are present on the telephone lines. Gate 370 will then generate a reset pulse through transistor 368 and gate 366 forcing reset of the program control and the counters.

The external alarm 66 is controlled by transistors 434 and 436 in the audio control 432 by completing a circuit therethrough from the voltage line 46 in state one of the program control. Priority input card circuits having transistors 298 control the audio signal line 308 for this purpose.

The chart shown in FIG. 8 summarizes the operations. The first off-hook waiting period is designed to permit the unit to acquire power from the telephone lines. During the second on-hook waiting period, the lines are permitted to clear. The third off-hook waiting period is designed to await receipt of the dial tone so that the dialing operation may ensue during the fourth period of 20 seconds. During the fifth period, of 10 seconds, a coded frequency signal is transmitted in order to prepare the receiving station for a coded message. The coded message is produced during the sixth period of 10 to 25 seconds duration during which the coded frequency signals plus the code tone pulses are transmitted to identify the dialer in an error free manner. During the seventh period of 10 seconds, two return tone signals are awaited for automatic shut-down purposes. If no proper return tone signals are received, an eighth period ensues of 6 seconds during which the system is reset or recycled.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a signal transmission line and a condition monitoring switch, a data signalling system comprising a power circuit connected to the signal transmission line, switching means connected to the signal transmission line for loading thereof, oscillator means connected to the power circuit for imposing frequency signals on the signal transmission line, digital logic means energized through the power circuit by the signal transmission line for intermittently loading the power circuit and gating the oscillator means, power control means responsive to actuation of the condition monitoring switch for transferring power from the signal transmission line to the power circuit during operation of the digital logic means, said power circuit including parallel circuit sections respectively connected to the signal transmission line and the switching means for supplying energy respectively to the condition monitoring switch and the oscillator means, and a regulated power circuit section connected in series with one of the parallel circuit sections for supplying energy to the digital logic means.

2. The combination of claim 1 including means connected to the power circuit for detecting predetermined signal frequencies in the signal transmission line during operation of the digital logic means, and shutdown means responsive to detection of said predetermined frequencies by the detecting means for disabling the power control means to unload the signal transmission line and remove power from the power circuit.

3. The combination of claim 2 wherein said digital logic means includes a source of clock pulses, programming means connected to the power circuit for sequentially rendering the switching means, the oscillator means and the detecting means operative, counter means connecting the source of clock pulses to the programming means for timing the periods during which said switching means, oscillator means and detecting means are operative, code control means connected to the counter means for converting the clock pulses into control signals, and gating means connecting the code control means to the switching means and the oscillator means for said intermittent loading of the power circuit and gating of the oscillator means.

4. The combination of claim 3 wherein said counter means includes a pair of counters connected to the code control means for selecting different numbers of code pulses in a train of pulse groups from the clock pulses, delay means interconnected between said pair of counters for spacing said code pulses, and a third counter connected in series with said pair of counters for spacing programmed changes of the programming means.

5. In combination with a signal transmission line and a condition monitoring switch, a data signalling system comprising a power circuit connected to the signal transmission line, switching means connected to the signal transmission line for loading thereof, oscillator means connected to the power circuit for imposing frequency signals on the signal transmission line, digital logic means energized through the power circuit by the signal transmission line for intermittently loading the power circuit and gating the oscillator means, power control means responsive to actuation of the condition monitoring switch for transferring power from the signal transmission line to the power circuit during operation of the digital logic means, said digital logic means including a source of clock pulses, programming means connected to the power circuit for sequentially rendering the switching means and the oscillator means operative, counter means connecting the source of clock pulses to the programming means for timing the periods during which said switching means and oscillator means are operative, code control means connected to the counter means for converting the clock pulses into control signals, and gating means connecting the code control means to the switching means and the oscillator means for said intermittent loading of the power circuit and gating of the oscillator means.

6. The combination of claim 5 wherein said counter means includes a pair of counters connected to the code control means for selecting different numbers of code pulses in a train of pulse groups from the clock pulses, delay means interconnected between said pair of counters for spacing said code pulses, and a third counter connected in series with said pair of counters for spacing programmed changes of the programming means.

7. In combination with a signal transmission line and a condition monitoring switch, a data signalling system comprising analog interface means connected to the signal transmission line for monitoring and transmitting signals to the transmission line, digital logic means connected to the analog interface means for programming operation thereof, and power control means responsive to actuation of the condition monitoring switch for transferring power to the digital logic means from the transmission line to generate said signals and program operation of the analog interface means, said digital logic means including a source of clock pulses, programming means for controlling operations of the analog interface means, counter means connecting the source of clock pulses to the programming means for timing said operations and code control means connected to the counter means for generating said signals, said counter means including a pair of counters connected to the code control means for selecting different numbers of code pulses in a train of pulse groups from the clock pulses, delay means interconnected between said pair of counters for spacing said code pulses, and a third counter connected in series with said pair of counters for spacing programmed changes of the programming means.

8. In combination with a signal transmission line and a condition monitoring switch, a data signalling system comprising a power circuit connected to the signal transmission line, analog interface means connected to the signal transmission line for monitoring and transmitting signals to the transmission line, digital logic means connected to the analog interface means for programming operation thereof, and power control means responsive to actuation of the condition monitoring switch for transferring power to the power circuit from the transmission line.

9. The combination of claim 8 wherein the power circuit includes parallel circuit sections respectively connected to the signal transmission line and the analog interface means for supplying energy to the condition monitoring switch, and a regulated power circuit section connected in series with one of the parallel circuit sections for supplying energy to the digital logic means.

* * * * *